Dec. 5, 1939.  U. DE CARIA  2,182,285

ADJUSTING MECHANISM FOR PROPELLER BLADES AND THE LIKE

Filed April 6, 1938

Inventor,
Ugo De Caria

Patented Dec. 5, 1939

2,182,285

UNITED STATES PATENT OFFICE 2,182,285

ADJUSTING MECHANISM FOR PROPELLER BLADES AND THE LIKE

Ugo de Caria, Milan, Italy

Application April 6, 1938, Serial No. 200,543
In Italy June 5, 1937

2 Claims. (Cl. 74—280)

This invention relates to improvements in mechanism for adjusting the relative position of rotating parts as, for instance, the blades of a propeller for varying the pitch thereof.

The object of the invention is to provide a simple arrangement for effecting adjustment within wide limits by selectively varying the angular position of a rotatable shaft.

Figure 1:
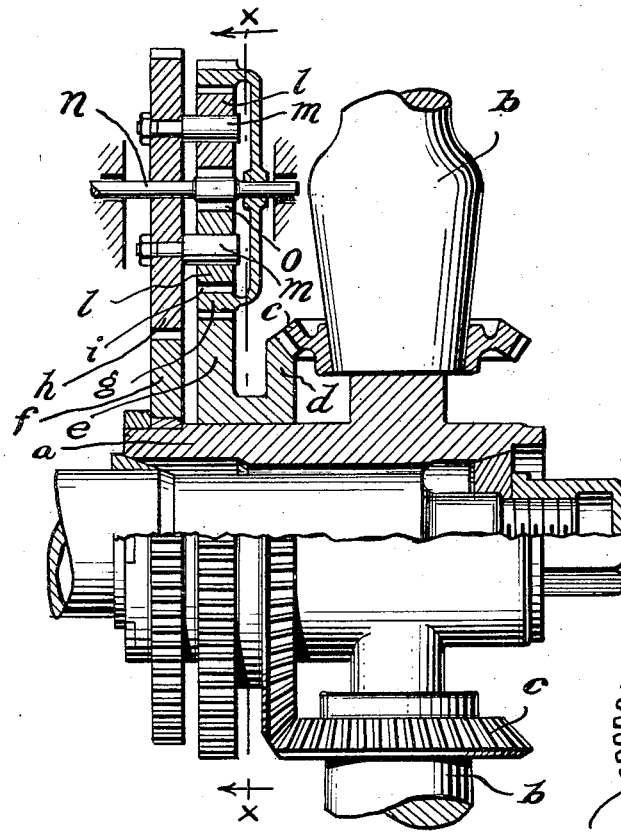
Fig. 1 is a sectional view partly in elevation of a mechanism constructed in accordance with the invention.
Figure 2:
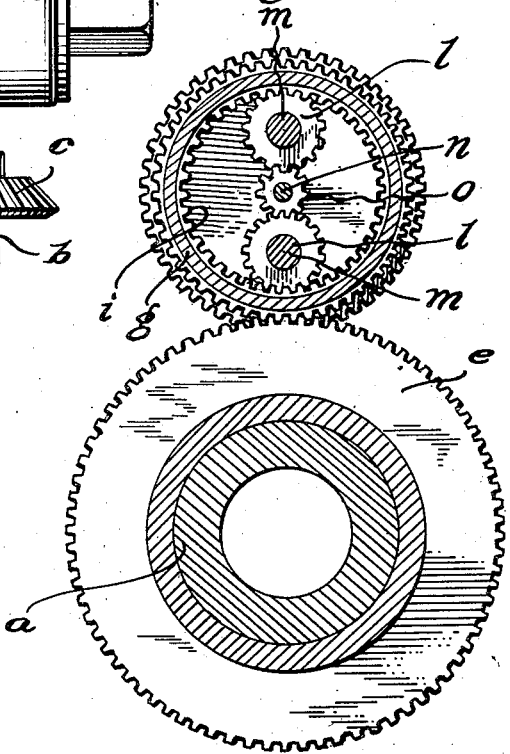
Fig. 2 is a section on the line X—X of Fig. 1.

Referring to the drawing in detail, $a$ designates the hub of a propeller on which the shanks $b$ of the blades are rotatably mounted whereby the blade pitch may be varied as desired. A bevel gear wheel $c$ is fixed to the shank of each blade and meshes with a corresponding gear wheel $d$ rotatably mounted on the hub $a$ whereby rotary movement of the gear wheel $d$ relative to the hub $a$ produces a rotary adjusting movement of the propeller blade.

The gear wheel $d$ is formed integral with a gear wheel $e$, both gear wheels $d$ and $e$ being rotatable on the hub $a$. A gear wheel $f$ is keyed on the hub $a$ and is of slightly smaller diameter than the relatively rotatable gear wheel $e$.

The gear wheels $e$ and $f$ mesh, respectively, with gear wheels $g$ and $h$ both of which latter are freely rotatable on an adjusting shaft $n$ rotatably mounted in a part fixed with relation to the hub $a$. The gear wheel $g$ is in the form of a ring gear and is provided with internal teeth $i$ meshing with planetary gear wheels $l$ loosely rotatable on supporting pins $m$ projecting laterally from the gear wheel $h$. The planetary gear wheels are also in mesh with a sun gear wheel $o$ rigidly secured to the shaft $n$.

The gear wheel sets $e$, $g$ and $f$, $h$ having different gear ratios, the gear wheels $g$ and $h$ revolve at different speeds. Consequently, the planetary gear wheels $l$ carried along with the rotating gear wheel $h$ revolve about the pins $m$.

The ratio between the number of teeth of the several gear wheels is so chosen that as long as the gear wheels $e$ and $f$ revolve at the same angular speed and no change in the pitch of the propeller is desired, the sun gear $o$ remains motionless.

By rotating the shaft $n$ either manually or through a power drive, the gear wheel $e$ is moved angularly with respect to the hub $a$ and through the gear wheels $d$ and $c$ the position of the propeller shank $b$ is varied with respect to the hub $a$ and the pitch of the propeller may be thus varied as desired.

Having now particularly described and ascertained the nature of my said invention and in what manner the same is to be performed, I declare that what I claim is:

1. A mechanism of the character described comprising a rotatable hub, a member mounted for adjustment on said hub, a gear wheel keyed to said hub, a second gear wheel of different size from the first mentioned gear wheel loosely mounted on said hub, means connecting the second mentioned gear wheel with the adjustable member for effecting adjustment thereof, a shaft, a sun gear wheel on said shaft, planetary gear wheels meshing with the sun wheel, a ring gear meshing with both said planetary gear wheels and the second mentioned gear wheel, and means connecting the planetary gear wheels with the first mentioned gear wheel, said shaft being normally at rest during rotation of the hub and adapted, upon rotation thereof, to effect displacement of the second mentioned gear with respect to said hub and thereby effect adjustment of the adjustable member.

2. A mechanism of the character described comprising a rotatable hub, a member mounted for adjustment on said hub, a gear wheel keyed to said hub, a second gear wheel of different size from the first mentioned gear wheel loosely mounted on said hub, means connecting the second mentioned gear wheel with the adjustable member for effecting adjustment thereof, a shaft, a sun gear wheel on said shaft, planetary gear wheels meshing with the sun wheel, a ring gear meshing with both said planetary gear wheels and the second mentioned gear wheel, a gear wheel meshing with the first mentioned gear wheel and constituting a carrier for said planetary gear wheels.

UGO DE CARIA.